United States Patent [19]

Beresniewicz

[11] 4,294,738
[45] Oct. 13, 1981

[54] WATER-EXTENDIBLE OLIGOMER SOLUTIONS AND COATINGS THEREFROM

[75] Inventor: Aleksander Beresniewicz, Wilmington, Del.

[73] Assignee: E. I. Du Pont de Nemours and Company, Wilmington, Del.

[21] Appl. No.: 201,468

[22] Filed: Oct. 28, 1980

[51] Int. Cl.³ .............................................. C08L 61/20
[52] U.S. Cl. .................... 260/29.4 UA; 260/29.6 TA; 260/29.6 MQ; 260/31.4 R; 260/31.6; 260/32.8 R; 260/32.8 N; 260/33.2 R; 260/33.4 R; 252/8.9; 428/501; 428/503; 428/507
[58] Field of Search ............... 260/29.4 UA, 29.6 TA, 260/29.6 MQ

[56] References Cited

U.S. PATENT DOCUMENTS

| | | | |
|---|---|---|---|
| 3,028,367 | 4/1962 | O'Brien | 260/77.5 |
| 3,203,918 | 8/1965 | Goldberg et al. | 260/29.6 |
| 3,208,963 | 9/1965 | Jaspaski | 260/29.6 |
| 3,216,852 | 11/1965 | Goldberg | 117/138.8 |
| 3,573,951 | 4/1971 | Abbott et al. | 117/7 |
| 4,137,309 | 1/1979 | Wingler et al. | 526/86 |
| 4,158,736 | 6/1979 | Lewis et al. | 560/205 |
| 4,192,826 | 3/1980 | Beresniewicz | 525/425 |
| 4,205,991 | 6/1980 | Becker et al. | 106/22 |
| 4,230,609 | 10/1980 | Burroway et al. | 260/29.6 TA |
| 4,230,810 | 10/1980 | Lattime | 526/224 |

OTHER PUBLICATIONS

S. A. Miller, "Ethylene and its Industrial Derivatives", Ernest Benn, Ltd., London, 1969.
Thomas J. Miranda, "Thermosetting Acrylics", Journal of Paint Technology, vol. 38, No. 499, Aug. 1966, pp. 469–477.

*Primary Examiner*—Joseph L. Schofer
*Assistant Examiner*—Bernard Lipman

[57] ABSTRACT

Oligomer solution, process of increasing the water-miscibility of the oligomer solution, one- and two-part coating solutions containing the oligomer solution, and substrates coated with the coating solution, said oligomer solution being miscible with at least 12 wt % of water, based on non-volatile ingredients, and consisting essentially of:

(a) about 50 to about 94 wt % of an oligomer having a degree of polymerization (DP) of about 10 to about 50, for example, an oligomer of vinyl acetate, hydroxyethyl acrylate, and a $C_{1-8}$ alkyl acrylate;

(b) 0 to about 30 wt % of a polyalkylene ether glycol having a molecular weight of about 400 to about 1300; and

(c) 0 to about 20 wt % of a water-miscible solvent, with the sum of the weight percentages being 100%.

5 Claims, 3 Drawing Figures

WATER-EXTENDIBLE OLIGOMER SOLUTIONS AND COATINGS THEREFROM

DESCRIPTION

1. Technical Field

This invention relates to cross-linkable low molecular weight addition copolymers of polar vinyl monomers and water-extendible solutions and coated objects therefrom.

2. Background

Increasing concern over air-pollution and tightening United States governmental regulations controlling the release of organic solvents to the atmosphere provide a growing demand for coating formulations which are either water-based or which contain a substantial portion of water, i.e., are water-extended. Conventional water-based or water-extended polymeric coating formulations are either aqueous emulsions or solutions of amine or ammonia-neutralized carboxylated polymers. The emulsions are incapable of providing continuous, pin-hole-free, glossy, thin (0.3 mil; 7.6μ) films required for many coating uses. Amine-neutralized formulations do not cure rapidly enough for many industrial coating operations, since the amines are inhibitors of conventional curing processes which employ nitrogenous cross-linking resins such as melamine or urea formaldehyde resins; the amines are also toxic.

It is an object of this invention to provide water-extendible solutions of cross-linkable low molecular weight addition copolymers of polar vinyl monomers. A further object is to provide substrates coated with such copolymers. Another object of this invention is to provide coatings having equivalent properties to those derived from organic solvent-based systems, particularly in regard to thickness, gloss, and moisture resistance. Still another object is to provide coating solutions which are similar in concentration, application viscosity, and stability to conventional, known, organic solvent-based coatings but which, in use, release significantly less organic solvent to the atmosphere than conventional coatings and which, in addition, meet present and foreseen solvent emission regulations for the coating industry. A further object is to provide coating solutions which are not amine-neutralized. Other objects will become apparent hereinafter.

The vinyl compounds, alkyl acrylate and methacrylate esters and hydroxyalkyl acrylate and methacrylate esters used in the practice of this invention are known monomers. Copolymers of various combinations of these monomers are also known. Mercaptans and mercaptoalkanols have been used in the art as chain transfer agents to regulate polymer molecular weight in free radical polymerization. Low molecular weight copolymer oligomers (degree of polymerization 6 to 30) containing combinations of the above alkyl-acrylates and hydroxyalkyl-acrylates or methacrylates are also known. Copolymerization of such monomers in the presence of water-soluble organic solvents, polyhydroxy alcohols and glycol ethers has been disclosed in the art, as have techniques for preparing uniform copolymers from monomers of unequal reactivity.

DISCLOSURE OF INVENTION

For further comprehension of the invention, and of the objects and advantages thereof, reference may be made to the following description and accompanying drawings, and to the appended claims in which the various novel features of the invention are more particularly set forth.

In summary, the invention resides in:
1. an oligomer solution which is miscible with at least 12 wt % of water, based on non-volatile ingredients of the solution;
2. the process of increasing the water-miscibility of the oligomer solution by about 20% to about 60%;
3. a coating solution comprising water-extended oligomer solution, said coating solution containing not more than 250 g of volatile organic compounds per liter of solution, excluding water, and not more than 75 wt % non-volatile ingredients;
4. the coating solution as a two-part system; and
5. cured coated substrates.

The oligomer solution consists essentially of:
(a) about 50 to about 95 wt %, preferably 75 to 90 wt %, of an oligomer having a degree of polymerization (DP) of about 10 to about 50;
(b) 0 to about 30 wt %, preferably 5 to 20 wt %, of at least one polyalkylene ether glycol having a molecular weight of about 400 to about 1300; and
(c) 0 to about 20 wt %, preferably 5 to 15 wt % of a water-miscible solvent, with the sum of the weight percentages being 100%.

The use of the term "consists (consisting) essentially of" is intended to reflect the fact that certain features are essential to the invention. Such use is not intended to preclude the inclusion of non-essential features, so long as the non-essential features do not adversely affect the invention to the extent that the inventive features are substantially destroyed.

The polyalkylene ether glycol can be any diol having a molecular weight of about 400 to about 1300 and having some miscibility in water; preferred glycols are of the formula $HO(R^3O)_nOH$ wherein $R^3$ is a linear or branched alkylene group of 1 to 4 carbon atoms, and n is an integer of such value as to provide the molecular weight range of about 400 to about 1300. Polypropylene Glycol-425 is more preferred. Mixtures of such glycols can be used. The glycol serves as a cosolvent for polymerization, increases hydroxyl functionality useful in cross-linking, lowers the solution viscosity, and extends the pot-life of catalyzed coating formulations. Polyalkylene ether glycols which have good to borderline miscibility in water can be used; those having a molecular weight of about 500 are preferred.

The water-miscible solvent can be any compound, or a mixture of compounds, which is a solvent for, but chemically inert to, the oligomer and the polyalkylene ether glycol. Suitable compounds include isopropanol, n-butanol, t-butanol, methanol, methyl ethyl ketone, ethylene glycol monoethyl ether, diethylene glycol monoethyl ether acetate, diethylene glycol diethyl ether, diethylene glycol monomethyl ether acetate, propylene glycol ethyl ether, dipropylene glycol methyl ether, and diacetone alcohol.

Conveniently, the polyalkylene ether glycol and the water-miscible solvent of the oligomer solution are introduced during the preparation of the oligomer, that is, during the monomer polymerization reaction. Cellosolve ® (ethylene glycol monoethyl ether) is a preferred solvent for the preparation of the preferred oligomers which contain vinyl acetate, because it is significantly higher boiling than vinyl acetate. Addition of a low molecular weight alcohol, such as isopropanol, at the end of the reaction, to be discussed below, helps to reduce the oligomer viscosity and also helps to stabilize the formulated oligomers of the coating solution against premature crosslinking.

The oligomer, which has a degree of polymerization (DP) of about 10 to about 50, is prepared by uniformly copolymerizing, using a conventional, free radical, polymerization initiator and, optionally, a water-miscible solvent, in the presence of about 0.5 to about 10 wt %, preferably 2 to 5 wt %, of a mercaptan of the formula $R^2SH$ wherein $R^2$ is hydroxyalkyl or alkyl of 2 to 10 carbon atoms, preferably mercaptoethanol:
(a) 0 to about 80 wt %, preferably 30 to 70 wt%, of a monomer selected from vinyl acetate, vinyl propionate, N-vinyl pyrrolidone, acrylamide, acrylonitrile, vinyl chloride, methyl vinyl ether, ethyl vinyl ether, and styrene, preferably vinyl acetate; provided, however, the amount of styrene shall not exceed 60 wt %;
(b) about 5 to about 50 wt %, preferably 15 to 40 wt %, of a monomer selected from hydroxyethyl and hydroxypropyl acrylates and methacrylates, preferably an acrylate, more preferably hydroxyethyl acrylate; and
(c) 0 to about 80 wt %, preferably 1.5 to 20 wt %, of a monomer selected from alkyl acrylates and alkyl methacrylates, preferably an alkyl acrylate, wherein alkyl is of 1 to 8 carbon atoms, with at least one monomer from (a) or (c) preferably being present, and with the sum of the weight percentages being 100%.

The hydroxyalkyl monomer, a required monomer, provides hydroxyl functionality for cross-linking and for compatibility with water. The optional alkyl acrylate or alkyl methacrylate monomer provides structural flexibility and water compatibility to varying degrees, depending on the alkyl moiety, and clarity in the ultimate film or coating.

The mercapto compound, a required ingredient, functions as a chain transfer agent to limit oligomer molecular weight. Comparatively large amounts, up to 10 wt %, are used in the present process in order to obtain unusually low molecular weight, i.e., a degree of polymerization in the range of 10 to 50. Mercaptoethanol is preferred as it enhances water-compatibility and also provides a hydroxyl group at one end of the polymer chain. Butyl mercaptan can also be used; dodecyl mercaptan has been found to be too hydrophobic. Substantially all the mercaptan is incorporated into the oligomer chains.

The process of preparing the oligomer solution is carried out by feeding to a reactor, optionally containing polyalkylene ether glycol and/or water-miscible solvent, maintained at constant temperature, one stream, or preferably two streams simultaneously, all of the oligomer ingredients and, optionally, water-miscible solvent. When two streams are used, the mercaptan and water-miscible solvent are fed in one stream, while the monomers are fed in the second stream. The polymerization initiator can be in either stream. If vinyl acetate, vinyl propionate or vinyl chloride is present, however, it is necessary that only 90% of the monomers (b) and (c) be present because of their significantly higher reactivities. Feed rates are controlled so that the monomers copolymerize at the same rate they are added. If 10% of monomers (b) and (c) was withheld, these withheld monomers are added in a finishing step and polymerized continuously in the presence of additional free radical initiator.

Preparation of homogeneous oligomers of vinyl monomers such as vinyl acetate with acrylic monomers is difficult because of the large differences in their relative reactivities. A batch process generally is employed, which process leads to substantially complete monomer conversion and results in uniform comonomer distributions. It is anticipated that the batch process could be adapted to continuous operation.

More specific to the aforesaid description, in a preferred embodiment, all of the glycol and some of the solvent, if used, are placed in a reaction vessel equipped with a reflux condenser, stirrer, thermometer, and two addition funnels. The temperature of this "initial heel" is brought to about 100° C., at which time addition of one, or preferably, two streams is begun. These streams are added at a uniform rate over a period of 3 to 4 hours and consist of all oligomer ingredients plus a free-radical initiator having a relatively short half-life, e.g., 5–15 minutes, preferably azobis(isobutyronitrile) and, optionally, additional solvent.

The polymerization is carried out at a temperature at which the vinyl monomer is just refluxing. With a proper choice of monomer addition rate, and concentrations of the initiator and mercaptan (which usually is a slight retardant), a steady-state condition in the reactor is reached, as indicated by a constant temperature and a constant rate of reflux of the vinyl monomer. Under such polymerization conditions there is no buildup of the less reactive vinyl monomer. Hence, the monomers are copolymerizing at approximately the rate at which they are added to the reaction vessel. The generation of free radicals is also constant, since the initiator has a relatively short half-life.

At the end of the addition time of the continuous feed(s), any withheld monomers are added, at a reduced rate, over a period of 20–80 minutes, preferably 30 to 60 minutes. During this period the polymerization temperature is allowed to rise to 115°–120° C., and the polymerization is forced substantially to completion by incremental addition of a suitable free radical initiator, such as t-butyl peroctoate. Additional solvent can be added, after completion of the polymerization, in order to reduce the viscosity to a desired level.

It should be noted that peroxides are not suitable as the principal polymerization initiator in the process because they are activated by the mercaptans and are, therefore, too short-lived at the polymerization temperature.

The mercaptan chain transfer agent is preferably kept separate from the monomers, i.e., in a separate feed stream, because it can initiate their premature polymerization. The mercaptan is compatible with azobis(isobutyronitrile) and can serve as its solvent.

The "active" ingredients of the oligomer solution are its non-volatile ingredients, i.e., the hydroxy-functional copolymeric oligomer, and optionally, but preferably, the polyalkylene ether glycol. The active ingredients are polar and at least partially miscible with water. The miscibility of the oligomer solution with water is dependent on several factors, particularly the inherent polarity of the oligomer monomers and the combined hydroxyl functionality of the oligomer and glycol contained in the oligomer solution. Miscibility with water has, for example, been found to show a linear dependence on the total hydroxyl concentration of the oligomer solution. Hydroxyl content can vary from about 1 to about 6, preferably 2 to 4, equivalents of OH per 1000 g of oligomer and glycol present in the oligomer solution.

Figure 1:
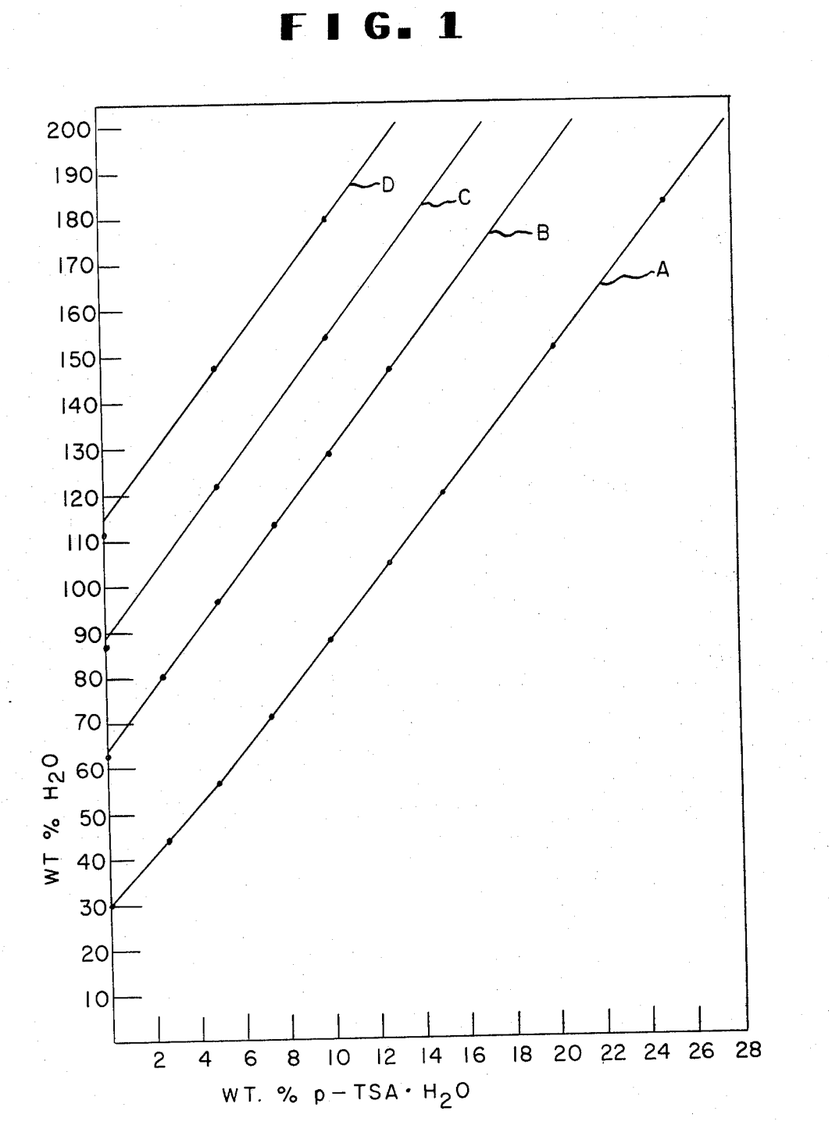
FIG. 1 includes plots which show the effectiveness of p-toluenesulfonic acid monohydrate as a water-solubilizing agent in "extending" oligomer solutions, in the presence of varying amounts of isopropanol which itself enhances the tolerance of the oligomer solution for water.

The oligomer solutions of this invention tolerate addition of at least 12 wt %, preferably at least 20 wt %, of water before separating into two phases. This tolerance can be increased by adding water-miscible organic compounds such as methanol or isopropanol, but this is undesirable since such volatile compounds contribute to the volatile organic compounds (VOC). The term "volatile organic compounds" is intended to include organic compounds which are added as solvents and any traces of unpolymerized monomers. It has been found that the addition of a small quantity of a non-volatile, water-soluble compound such as p-toluenesulfonic acid markedly increases the miscibility of the oligomer solution with water. FIG. 1 shows the effect of added p-toluenesulfonic acid on the water miscibility of a vinyl acetate-containing oligomer solution. FIG. 1 also shows that this effect persists in the presence of a substantial quantity of isopropanol. The amounts of isopropanol represented in Curves A to D of FIG. 1 are, respectively, 0, 200, 250 and 300 g per liter of solution, excluding water.

It has been discovered that the miscibility with water of the oligomer solution can be increased by up to 50% (see Example 11) by means of certain water-soluble compounds which will be discussed below. By increasing water-miscibility of the oligomer solutions in the manner described, water-extended coating solutions having concentrations of about 30 to 75 wt % non-volatile ingredients (NVI), preferably 40 to 70 wt % NVI, and containing not more than 250 g, preferably not more than 180 g, of volatile organic compounds per liter of solution, excluding water, are provided. The NVI of the coating solutions consists of all the ingredients contained therein except for the organic solvent and water. The coating solutions, in use, release environmentally acceptable low levels of volatile organic vapors to the atmosphere. Coating solutions containing approximately 40 to 50 wt % NVI are especially useful for providing, by continuous roll coating, clear films on cellulosic substrates. The water-extended solutions of this invention are particularly suited to the preparation of clear, water-resistant topcoats for panelboard and other wood or paper substrates. These coatings can be applied in one step, replacing the multi-step application required with conventional organic solvent-based coatings currently used and which contain 20–30 wt % NVI and emit excessive quantities of organic vapors. Use of higher-NVI (i.e., over 75 wt % NVI) solvent coating systems as a means of reducing solvent emissions cannot provide the uniformly thin films which are especially important for paper and wood panel coatings and which are provided through use of a lower-NVI content solvent coating system. As already noted above, satisfactory application of thin, glossy, pin-hole-free coatings required for factory-finished wood panel products is also not possible with water-based emulsions or water-extended, carboxylated, amine-neutralized polymers available in the art.

p-Toluenesulfonic acid is a preferred miscibilizing agent, as this compound also serves as a curing catalyst in the coating solution. It is of interest that of four compounds widely used as curing catalysts in commercial coating formulations, i.e., p-toluenesulfonic acid, dodecylbenzenesulfonic acid, methanesulfonic acid and dinonylnaphthalenesulfonic acid, only the first compound increases the water-miscibility of the oligomer solutions of this invention (Example 10). Miscibilizing agents can be present in the coating solution in the concentration range of about 1 to about 15 wt %, preferably 2 to 8 wt %, based on active (non-volatile) ingredients. Water-soluble, non-volatile compounds which increase the water-miscibility of the oligomer solution are selected from p-toluenesulfonic acid, trifluoromethanesulfonic acid, 5-sulfosalicylic acid, 1-naphthalenesulfonic acid, 2,5-dimethylbenzenesulfonic acid, the sodium salts of the above acids, the sodium salts of aliphatic monocarboxylic acids having 6 to 12 carbon atoms, ammonium benzoate, and sodium di-2-ethylhexylsulfosuccinate.

The process of increasing the water-miscibility of the oligomer solution is carried out by contacting and combining the solution with the aforesaid water-miscibilizing agent, in the amount of about 1 to about 15 wt %, preferably 2 to 8 wt %, based on the active (non-volatile) ingredients of the oligomer solution.

The coating solution of the invention consists essentially of:

(a) about 30 to 75 wt %, preferably 40 to 70 wt %, of non-volatile ingredients which are present in amounts, relative to each other:
  (i) 30 to 80 wt %, preferably 45 to 75 wt %, of an oligomer having a degree of polymerization (DP) of about 10 to about 50 and a polyalkylene ether glycol having a molecular weight of about 400 to about 1300, the amount of glycol being 0 to 60 wt % of the amount of oligomer;
  (ii) 2 to 12 wt %, preferably 3 to 8 wt %, of a non-volatile water-miscible compound defined as above;
  (iii) 5 to 65 wt %, preferably 20 to 40 wt %, of a conventional amine-aldehyde cross-linking resin, such as an alkylated urea-aldehyde or melamine-aldehyde resin; and
  (iv) 0 to 10 wt %, preferably 3 to 6 wt %, of a conventional acidic curing catalyst;
and
(b) 25 to about 70 wt %, preferably 30 to 60 wt %, of the following volatile ingredients which are present in amounts, relative to each other:
  (i) 5 to 70 wt %, preferably 15 to 50 wt %, of water-miscible organic solvent; and
  (ii) 30 to 95 wt %, preferably 50 to 85 wt %, of water,
with the sum of the weight percentages being 100% for each of (a) and (b); (i), (ii), (iii) and (iv) of (a); and (i) and (ii) of (b), and with the proviso that the amounts of non-volatile ingredients, water and organic solvent are such that the coating solution contains not more than 250 g of volatile organic compounds per liter of solution, excluding water, the oligomer of (a) (i) being prepared by the process described hereinabove.

In the practice of this invention, the oligomer solution can be combined with the cross-linking resin, miscibilizing agent, curing catalyst, water, and solvent, as described above, to prepare the coating solution. The coating solution can be applied to the substrate to be coated by roll-coating or other application techniques known in the industry, followed by heating at a temperature of about 120° F. (49° C.) to about 240° F. (116° C.), preferably 160° to 200° F. (71° to 93° C.) for sufficient time to dry and cure the coating, the time depending on factors such as temperature, solution concentration, catalyst, and air circulation. Cures are normally complete within 10 minutes, frequently within seconds.

Coating solutions of this invention are those which contain not more than 250 g of volatile organic compounds (VOC) per liter of solution, excluding water. Preferred coating solutions contain not more than 180 g of VOC per liter of solution, excluding water. The ability to meet these VOC limitations at desirable solution concentrations depends critically on the degree to which the oligomer solution can be diluted with water.

Because of the inclusion of the cross-linking resin (curing resin) and the acidic curing catalyst in the coating solution, the shelf-life of the solution may be less than is desired. To preclude and/or minimize any reduction in shelf-life it is preferred to use a two-part system wherein the cross-linking resin is in one part and the curing catalyst is in the other part. The two parts can then be stored and admixed just prior to use. For example, one part can include the oligomer solution and cross-linking agent, the other part can include the acidic curing catalyst. Either or both parts can include the water-miscibilizing agent, water and organic solvent.

In the following examples of specific embodiments of the present invention, parts and percentages are by weight.

EXAMPLE 1

In a 500 ml round-bottom flask equipped with a stirrer, condenser, addition funnel, nitrogen purge, and a thermometer an initial heel consisting of 57 grams of Cellosolve ® (ethylene glycol monoethyl ether) was heated to 103° C., using a heating mantle. At this point the monomer solution, consisting of:

170.4 g vinyl acetate (VAc)
58.0 g hydroxyethyl acrylate (HEA)
9.6 g mercaptoethanol
7.0 g azobis(isobutyronitrile)

was added in the following manner from a calibrated addition funnel: 15 ml at once; the remainder at 1 ml/min over a period of 235 min. During this period the temperature of the reactants remained quite constant between 97° and 99° C.

Two minutes after the end of the monomer feed the post-addition was begun and consisted of:

2.0 g hydroxyethyl acrylate
0.3 g mercaptoethanol
3.0 g tripropylene glycol.

This post-addition was added dropwise over a period of 12 minutes. Over the next 20 min the reaction temperature was slowly brought to 112° C. At this point 14.1 g of unpolymerized VAc was distilled off under a partial vacuum.

The product was a slightly yellowish, clear solution which had a viscosity at 40° C. of 810 cSt. The calculated NVI content was 80.5 wt %, and the composition by wt % of active ingredients was:

VAc: 68.2 wt %
HEA: 26.2 wt %
Mercaptoethanol: 4.3 wt %
Tripropylene glycol: 1.3 wt %.

EXAMPLE 2

In a 500 ml round-bottom flask equipped with a heating mantle, condenser, stirrer, nitrogen purge, and two calibrated addition funnels, an initial heel consisting of 34.9 g of Polypropylene Glycol 1025 was heated to 96° C.

At this point the addition of two separate feeds was started.
Feed 1:
250 g vinyl acetate
98 g hydroxyethyl acrylate
11 g butyl acrylate
Feed 2:
16.4 g mercaptoethanol
28.2 g monoethyl ether of ethylene glycol
2.0 g azobis (isobutyronitrile).

5 Ml of feed 1 was added at once, then remainder was added dropwise at 1.5 ml/min; 1.5 ml of feed 2 was added at once, then the rest was added in 0.4 ml aliquots every 2 minutes. Both feeds were added in this manner over a period of 240 minutes.

During this time the polymerization temperature ranged between 94° and 97° C., and there was a constant slight reflux of the vinyl acetate.

Three minutes after addition of feeds 1 and 2 was complete, the post-addition was begun. This was added dropwise over a period of 22 minutes and consisted of:

6.1 g hydroxyethyl acrylate,
1.2 g butyl acrylate.

Two minutes after addition of feeds 1 and 2 was complete, 0.5 g of 50% t-butyl peroctoate solution in mineral spirits was added. Three more 0.5 g additions of this booster initiator were made at 15-minute intervals, to assure complete polymerization of vinyl acetate. During this period the temperature was raised slowly to 120° C. Seventeen minutes after the last addition of the booster initiator, the reaction product was cooled. When the temperature dropped to 80° C., 66.5 g of isopropanol was added.

The product is a clear, yellowish liquid. Its viscosity, at 25° C., is 10,920 cSt and the NVI, as determined at 65° C. under vacuum for 24 hours, are 78.6 wt %.

The active ingredients of this product are:
VAc: 59.0 wt %
HEA: 25.4 wt %
Butyl Acrylate: 3.1 wt %
Mercaptoethanol: 4.0 wt %
Polypropylene Glycol 1025: 8.5 wt %.

EXAMPLE 3

In a 500 ml round-bottom flask equipped with a heating mantle, condenser, stirrer, nitrogen purge, and two calibrated addition funnels, an initial heel consisting of 32.0 g of Polypropylene Glycol 425 and 26.0 g of ethylene glycol monoethyl ether was heated to 96° C.

At this point the addition of two separate feeds was started.
Feed 1:
303 g vinyl acetate
36 g hydroxyethyl acrylate
14 g butyl acrylate
2.0 g azobis (isobutyronitrile)
Feed 2:
17.8 g mercaptoethanol.

20 Ml of feed 1 was added at once, then the rest was added dropwise at 1.5 ml/min; feed 2 was added at 0.07 ml/min. Both feeds were added over a period of 230 minutes.

During this time the polymerization temperature ranged between 98° and 100° C., and there was a constant slight reflux of the vinyl acetate.

Three minutes after addition of feeds 1 and 2 was completed, the post-addition was begun. This was added dropwise over a period of 22 minutes and consisted of:

4.0 g hydroxyethyl acrylate,
2.0 g butyl acrylate.

Ten minutes after addition of feeds 1 and 2 was completed, 0.25 g of 100% t-butyl peroctoate was added. Three more 0.25 g additions of this booster initiator were made at 15-minute intervals to assure complete polymerization of vinyl acetate. During this period the temperature was raised slowly to 116° C. Seventeen minutes after the last addition of the booster initiator, the reaction product was cooled to 80° C. and 41.0 g of isopropanol was added.

The product is a clear liquid. Its viscosity, at 25° C., is 10,000 cSt and NVI, determined at 65° C. under vacuum for 24 hours, are 83.0 wt %.

The active ingredients of this product are:
VAc: 73.7 wt %
HEA: 9.9 wt %
Butyl Acrylate: 4.0 wt %
Mercaptoethanol: 4.4 wt %
Polypropylene Glycol: 425 8.0 wt %.

EXAMPLE 4

In a 500 ml round-bottom flask equipped with a heating mantle, condenser, stirrer, nitrogen purge, and two calibrated addition funnels, an initial heel consisting of 34.9 g of Polypropylene Glycol 425 and 26.0 g of ethylene glycol monoethyl ether was heated to 96° C.

At this point the addition of two separate feeds was started.

Feed 1:
100.0 g hydroxyethyl acrylate
251.0 g ethyl acrylate
2.6 g azobis(isobutyronitrile)

Feed 2:
17.8 g mercaptoethanol. 15 Ml of feed 1 was added at the start, the rest was added dropwise at 1.5 ml/min. Feed 2 was added at 0.07 ml/min. Both feeds were added over a period of 230 minutes.

During this time the polymerization temperature ranged between 107° and 109° C. Ten minutes after addition of feeds 1 and 2 was complete, 0.25 g of 100% t-butyl peroctoate was added. Three more 0.5 g additions of this booster initiator were made at 15-minute intervals. During this period the temperature was raised slowly to 119° C. Seventeen minutes after the last addition of the booster initiator, the reaction product was cooled to 80° C. and 41 g of isopropanol was added.

The product is a clear liquid. Its viscosity, at 25° C., is 1260 cSt and the NVI, determined at 65° C. under vacuum for 24 hours, are 86.0 wt %.

The active ingredients of this product are:
HEA 25.0 wt %
Ethyl Acrylate 62.5 wt %
Mercaptoethanol 4.45 wt %
Polypropylene Glycol 425 8.0 wt %.

EXAMPLE 5

In a 500 ml round-bottom flask equipped with a heating mantle, condenser, stirrer, nitrogen purge, and two calibrated addition funnels, an initial heel consisting of 120.0 g of Polypropylene Glycol 425 was heated to 96° C.

At this point the addition of two separate feeds was started:

Feed 1:
205 g vinyl acetate
49 g hydroxyethyl acrylate
14 g butyl acrylate
2.0 g azobis(isobutyronitrile)

Feed 2:
11.1 g mercaptoethanol.

Feed 1 was added 15 ml at once, then dropwise at 1.5 ml/min, and feed 2 was added 1 ml at once, then at 0.05 ml/min. Both feeds were added over a period of 151 minutes.

During this time the polymerization temperature ranged between 102° and 104° C. and there was a constant slight reflux of the vinyl acetate.

Three minutes after addition of feeds 1 and 2 was complete, the post-addition was begun. This was added dropwise over a period of 22 minutes and consisted of:

5.0 g hydroxyethyl acrylate,
2.0 g butyl acrylate.

Ten minutes after addition of feeds 1 and 2 was complete, 0.25 g of 100% t-butyl peroctoate was added. Three more 0.25 g additions of this booster initiator were made at 15-minute intervals to assure complete polymerization of vinyl acetate. During this period the temperature was raised slowly to 125° C. Seventeen minutes after the last addition of the booster initiator, the reaction product was cooled.

The product is a clear liquid. Its viscosity, at 25° C., is 29,000 cSt and the NVI, as determined at 65° C. under vacuum for 24 hours, are 96.0 wt %.

The active ingredients of this product
VAc: 49.8 wt %
HEA: 13.5 wt %
Butyl Acrylate: 4.0 wt %
Mercaptoethanol: 2.7 wt %
Polypropylene Glycol 425: 30.0 wt %.

EXAMPLE 6

In a 500 ml round-bottom flask equipped with a heating mantle, condenser, stirrer, nitrogen purge, and two calibrated addition funnels, an initial heel consisting of 80.0 g of Polypropylene Glycol 425 and 28.0 g of ethylene glycol monoethyl ether was heated to 96° C.

At this point the addition of two separate feeds was started.

Feed 1:
128 g vinyl acetate
170 g hydroxyethyl acrylate

Feed 2:
16.0 g mercaptoethanol
10.0 g methyl ethyl ketone
2.0 g azobis(isobutyronitrile).

Feed 1 was added initially 15 ml at once, then dropwise at 1.5 ml/min; feed 2 was added initially 1.8 ml at once, then at 0.15 ml/min. Both feeds were added over a period of 240 minutes.

During this time the polymerization temperature ranged between 104° and 106° C., and there was a constant slight reflux of the vinyl acetate.

Three minutes after feeds 1 and 2 were in, the post-addition was begun. This was added dropwise over a period of 22 minutes and consisted of 10.0 g hydroxyethyl acrylate. Ten minutes after addition of feeds 1 and 2 was complete, 0.2 g of t-butyl peroctoate was added. Three more 0.2 g additions of this booster initiator were made at 15-minute intervals to assure complete polymerization of vinyl acetate. During this period the temperature was raised slowly to 113° C. Seventeen minutes after the last addition of the booster initiator, the reaction product was cooled.

The product is a clear liquid. Its viscosity, at 25° C., is 12,680 cSt, and the NVI, as determined at 65° C. under vacuum for 24 hours, are 88.5 wt %.

The active ingredients of this product are:
VAc: 31.0 wt %
HEA: 45.0 wt %
Mercaptoethanol: 4.0 wt %
Polypropylene Glycol 425: 20.0 wt %.

EXAMPLE 7

In a 500 ml round-bottom flask equipped with a heating mantle, condenser, stirrer, nitrogen purge, and two calibrated addition funnels, an initial heel consisting of 32.0 g of Polypropylene Glycol 425 and 26.0 g of ethylene glycol monoethyl ether was heated to 96° C.

At this point the addition of two separate feeds was started.
Feed 1:
100 g N-vinyl pyrrolidone
100 g hydroxyethyl acrylate
152 g butyl acrylate
Feed 2:
16.0 g mercaptoethanol
12.0 g methyl ethyl ketone
2.6 g azobis(isobutyronitrile).

25 Ml of feed 1 was added at once, then dropwise at 1.5 ml/min, and feed 2 was added 1.3 ml at once, then at 0.14 ml/min. Both feeds were added over a period of 220 minutes.

During this time the polymerization temperature ranged between 103° and 106° C. Ten minutes after feeds 1 and 2 were in, 0.3 g of 100% t-butyl peroctoate was added. Another 0.3 g addition of this booster initiator was made after a further 15 minutes to assure complete polymerization of vinyl monomer. During this period the temperature was raised slowly to 117° C. Seventeen minutes after the last addition of the booster initiator, the reaction product was cooled.

The product is a clear slightly yellow liquid. Its viscosity, at 25° C., is 17,300 cSt and the NVI, as determined at 65° C. under vacuum for 24 hours, are 91.5 wt %.

The active ingredients of this product are:
N-vinyl pyrrolidone: 25.0 wt %
HEA: 25.0 wt %
Butyl Acrylate: 38.0 wt %
Mercaptoethanol: 4.0 wt %
Polypropylene Glycol 425: 8.0 wt %.

EXAMPLE 8

In a 500 ml round-bottom flask equipped with a heating mantle, condenser, stirrer, nitrogen purge, and two calibrated addition funnels, an initial heel consisting of 32.0 g of Polypropylene Glycol 425 and 26.0 g of ethylene glycol monoethyl ether was heated to 96° C.

At this point the addition of two separate feeds was started.
Feed 1:
40 g acrylonitrile
100 g hydroxyethyl acrylate
211 g ethyl acrylate
Feed 2:
16.0 g mercaptoethanol
13.0 g methyl ethyl ketone
2.0 g azobis(isobutyronitrile).

Feed 1 was added initially 20 ml at once, then dropwise at 1.5 ml/min, and feed 2 was added, initially 1 ml at once, then at 0.14 ml/min. Both feeds were added over a period of 230 minutes.

During this time the polymerization temperature ranged between 103° and 108° C. Ten minutes after feeds 1 and 2 were in, 0.2 g of t-butyl peroctoate was added. Three more 0.2 g additions of this booster initiator were made at 15-minute intervals to assure complete polymerization of acrylonitrile. During this period the temperature was raised slowly to 117° C. Seventeen minutes after the last addition of the booster initiator, the reaction product was cooled to 80° C. and 28 g of isopropanol was added.

The product is a clear liquid. Its viscosity, at 25° C., is 2770 cSt and the NVI, as determined at 65° C. under vacuum for a period of 24 hours, are 84.9 wt %.

The active ingredients of this product are:
Acrylonitrile: 10.0 wt %
HEA: 25.2 wt %
Ethyl Acrylate: 52.8 wt %
Mercaptoethanol: 4.0 wt %
Polypropylene Glycol 425: 8.0 wt %.

EXAMPLE 9

In a 500 ml round-bottom flask equipped with a heating mantle, condenser, stirrer, nitrogen purge, and two calibrated addition funnels, an initial heel consisting of 32.0 g of Polypropylene Glycol 425 and 26.0 g of ethylene glycol monoethyl ether was heated to 92° C.

At this point the addition of two separate feeds was started.
Feed 1:
201 g styrene
143 g hydroxyethyl acrylate
8 g n-butyl acrylate
2.6 g azobis(isobutyronitrile)
Feed 2:
17.8 g mercaptoethanol.

Feed 1 was added initially 10 ml at once, then dropwise at 1.5 ml/min. Feed 2 was added initially 0.2 ml at once, then at the rate of 0.07 ml/min. Both feeds were added over a period of 230 minutes.

During the feed addition period, the temperature ranged between 104° and 108° C. No reflux of monomers was observed. Ten minutes after the addition of Feeds 1 and 2 was completed, 0.2 g of t-butyl peroctoate booster initiator was added, and the temperature was allowed to rise to 121° C. Successive further additions of 0.3 g, 0.3 g and 0.2 g respectively, of t-butyl peroctoate were made at 15-minute intervals to assure complete copolymerization of styrene; 15 minutes after the final t-butyl peroctoate addition, the reaction product was cooled to 80° C. and 41 g of isopropanol was added.

The active ingredients of this product are:
Styrene: 50.0 wt %
HEA: 35.6 wt %
n-Butyl Acrylate: 2.0 wt %
Mercaptoethanol: 4.4 wt %
Polypropylene Glycol 425: 8.0 wt %.

EXAMPLE 10

A. An oligomer solution was prepared by the method described in Example 3, having a concentration of 90.0 wt % active ingredients and 10 wt % solvent which consisted of 1:1 mixture of methanol and water. The active ingredients consisted of:
- Vinyl acetate: 40.2 wt %
- Ethyl acrylate: 12.0 wt %
- Hydroxyethyl acrylate: 24.8 wt %
- Mercaptoethanol: 3.0 wt %
- Polypropylene Glycol 425: 20.0 wt %.

Several mixtures, each containing 10.0 g of this oligomer solution and 7.5 g of distilled water, were made. The components of these mixtures were not compatible; the mixtures separated into two phases on standing. To these mixtures small increments of various water-miscibilizing agents were added, until the mixture became homogeneous and single phase (miscibilized). The minimum amounts of these agents required to miscibilize the mixtures are listed below (the symbol ">"="greater than"):

| Additive | g Necessary to Miscibilize 10.0 g of Oligomer Solution in 7.5 g of Water |
| --- | --- |
| Solid p-TSA . $H_2O$ | 0.85 |
| Isopropanol | 2.2 |
| Tetrahydrofuran | 4.4 |
| Acetic Acid (glacial) | 2.5 |
| Methyl Acetate | >6.2 (remained cloudy) |

B. Similar experiments were carried out with additional compounds, using a larger amount (9.0 g) of water with the oligomer solution used in Part A.

| Additive | g Necessary to Miscibilize 10.0 g of Oligomer Solution in 9.0 g of Water |
| --- | --- |
| Dinonylnaphthalene-disulfonic acid | >3.0 (still 2 phases) |
| Concentrated $H_2SO_4$ | >3.0 (still 2 phases) |
| Dodecylbenzene-sulfonic acid | >3.0 (still 2 phases) |
| Urea | >3.0 (still 2 phases) |
| Methyl alcohol | 3.5 |
| t-Butyl alcohol | 3.3 |
| Isopropyl alcohol | 2.8 |
| n-Propyl alcohol | 3.2 |
| p-TSA . $H_2O$ | 1.2 |

It may be seen that p-TSA.$H_2O$, a water-miscible non-volatile ingredient, compatibilizes the oligomer solution with water more efficiently than water-soluble alcohols.

C. Experiments were carried out with additional compounds and an initially 2-phase oligomer solution/water mixture (7.0 g of water). The oligomer solution contained 80 wt % active ingredients, 13.6 wt % isopropanol, 4.4 wt % ethylene glycol monoethyl ether, and 2 wt % unreacted VAc. The active ingredients (wt %) were:
- VAc: 60.3 wt %
- HEA: 26.0 wt %
- Ethyl Acrylate: 2.0 wt %
- Polypropylene Glycol 425: 8.0 wt %
- Mercaptoethanol: 3.8 wt %.

| Additive | g Necessary to Miscibilize 10 g of Oligomer Solution in 7.0 g of Water |
| --- | --- |
| Sodium acetate . $3H_2O$ | >2.5 (still 2 phases) |
| $Na_2HPO_4$ . $7H_2O$ | >2.5 (still 2 phases) |
| Sodium p-toluene sulfonate | 0.4 |
| Ammonium benzoate | 0.6. |

D. Similar experiments were carried out with additional compounds and an initially 2-phase oligomer solution/water mixture (9.5 g of water). The oligomer has the same composition as that used in Part A; the solvent, however, contains water only.

| Additive | g Necessary to Miscibilize 10 g of Oligomer Solution in 9.5 g of Water |
| --- | --- |
| p-TSA . $H_2O$ | 1.3 |
| Na-p-TSA | 1.4 |
| 2,5-Dimethylbenzene sulfonic acid | 1.4 |
| Sodium-2,5-dimethyl benzene sulfonate | 1.2 |
| 1-Naphthalene sulfonic acid | 1.2 |
| 5-Sulfosalicyclic acid | 1.5 |
| Methane sulfonic acid | >4 (still 2 phases) |
| Disodium-1,5-naphthalene disulfonate | >4 (still 2 phases) |

E. Similar experiments were carried out with additional compounds, as in Part A, but using twice as much oligomer solution and water. The oligomer solution contained 80.4 wt % active ingredients, 5.4 wt % ethylene glycol monoethyl ether, 6.5 wt % methanol, 6.5 wt % isopropanol, and 1.2 wt % unreacted VAc. The active ingredients were:
- VAC: 59.5 wt %
- HEA: 26.4 wt %
- Ethyl Acrylate: 2.0 wt %
- Polypropylene Glycol 425: 8.5 wt %
- Mercaptoethanol: 3.4 wt %.

| Additive | g Necessary to Miscibilize 20 g of Oligomer Solution in 15 g of Water |
| --- | --- |
| Triton X-100 (non-ionic surfactant) | 3.0 (2 phases) |
| Sodium dioctyl sulfosuccinate (Aerosol OT-75) | 1.0 |
| p-TSA . $H_2O$ | 1.0 |
| Trifluoromethane-sulfonic acid | 0.5 |
| Sodium hexanoate | 3.0 (slightly cloudy) |
| Sodium heptanoate | 2.5 (slightly cloudy) |
| Sodium decanoate | 2.0 |
| Sodium butyrate | >4.0 (2 phases) |
| Heptanoic acid | >3.0 (2 phases) |
| Trifluoroacetic acid | >3.0 (2 phases) |

EXAMPLE 11

This example demonstrates the importance of oligomer ingredient selection in the preparation of coating solutions having substantial initial miscibility with water, and the role of p-toluene-sulfonic acid in increasing the water-miscibility.

Six oligomer solutions L–Q, prepared by methods described in Examples 2–9, had the compositions shown in Table 1. L, which is outside the scope of this invention, is included for comparison. Each oligomer solution was formulated with 34 wt % Cymel® 303 hexamethoxymethyl melamine cross-linking resin and 66 wt % oligomer active ingredients. Organic volatiles (VOC) in each case were 205 g/liter of formulation, corrected for water. The six oligomers, before formulation, were miscible with at least 12 wt % of water, based on non-volatile ingredients.

Water was added to each of the six formulations until the miscibility limit was reached, i.e., a second phase appeared. p-Toluenesulfonic acid, 3 wt % based on active (non-volatile) ingredients, was then added to each water-saturated formulation, followed by more water until the miscibility limit was again reached. Table 2 shows the amounts of water present at each miscibility limit and the NVI content at the miscibility limit with p-toluene-sulfonic acid (PTSA) present. It can be seen from Table 2 that the water content of one-phase coating formulations can be increased by 27 to 48% through the addition of 3 wt % p-toluenesulfonic acid and, depending on the initial tolerance for water of a given formulation, water-extended, one-phase coating formulations which contain substantially less than 250 g of volatile organic compounds per liter of solution, excluding water, can be prepared at NVI levels of 48 to 71 wt %. Such a wide range of NVI content permits the preparation of coatings for numerous divergent purposes while meeting or surpassing current United States solvent emission standards.

A comparison of Tables 1 and 2 shows the dependence of water tolerance on the oligomer composition, particularly the polarity of the oligomer components. The most polar oligomer, M, shows the highest tolerance for water; oligomer N, which differs from oligomer O only in that it contains ethyl acrylate instead of the less polar butyl acrylate, tolerates substantially more water than oligomer O. Oligomer M, which tolerates more water than oligomer N or oligomer O, derives high polarity from vinyl acetate, which is more polar than ethyl acrylate. Oligomer Q, intermediate in polarity and water tolerance between oligomer M and oligomer N, contains the extremely polar monomer N-vinyl-pyrrolidone. Note that oligomers M, N, O and Q contain equal percentages of hydroxylated components which also contribute strongly to oligomer polarity and water tolerance as well as provide cross-linking sites. Oligomer L, although rich in vinyl acetate, contains no hydroxylated components. Oligomer P which contains 50 wt % of the less preferred non-polar monomer styrene is nevertheless rendered sufficiently water tolerant by its other ingredients and by p-toluenesulfonic acid to provide useful, water-extended coating formulations.

It should be understood that water tolerances higher than those herein demonstrated can be obtained by employing oligomers of increased polarity and/or larger amounts of toluenesulfonic acid.

TABLE 1

| Oligomer Solution | Active Oligomer Ingredients | | | | | |
|---|---|---|---|---|---|---|
| | Monomer (a) | Wt % | Monomer (b) | Wt % | Monomer (c) | Wt % |
| L | VAc | 92.0 | — | — | BA | 4.0 |
| M | VAc | 58.7 | HEA | 24.9 | BA | 4.0 |
| N | — | | HEA | 25.0 | EA | 62.5 |
| O | — | | HEA | 25.0 | BA | 62.5 |
| P | STY | 50.0 | HEA | 35.6 | BA | 2.0 |
| Q | NVP | 25.0 | HEA | 25.0 | BA | 38.0 |

TABLE 1-continued

| Oligomer Solution | Active Oligomer Ingredients | | Equiv. of OH per 100 g of Active Ingredient |
|---|---|---|---|
| | Glycol[1] Wt % | RSH Wt % | |
| L | — | 4.0[2] | 0 |
| M | 8.0 | 4.4[3] | 0.312 |
| N | 8.0 | 4.4[3] | 0.312 |
| O | 8.0 | 4.4[3] | 0.312 |
| P | 8.0 | 4.4[3] | 0.404 |
| Q | 8.0 | 4.4[3] | 0.310 |

VAc = vinyl acetate
HEA = hydroxyethyl acrylate
EA = ethyl acrylate
BA = n-butyl acrylate
STY = styrene
NVP = N-vinyl pyrrolidone
[1] = polypropylene glycol 425
[2] = n-butyl mercaptan
[3] = mercaptoethanol

TABLE 2

| Oligomer in Formulation | Wt % H$_2$O at miscibility limit, based on active formulation ingredients | | % increase in water tolerance $100\left(\dfrac{y-x}{x}\right)$ | Wt % NVI at miscibility limit with 3% PTSA |
|---|---|---|---|---|
| | Without PTSA (x) | 3% PTSA (y) | | |
| L | 16.5 | 21.0 | 27.3 | 70.4 |
| M | 60.0 | 88.6 | 47.7 | 48.0 |
| N | 31.5 | 45.0 | 42.9 | 55.2 |
| O | 16.5 | 21.0 | 27.3 | 70.4 |
| P | 15.0 | 19.5 | 30.0 | 71.0 |
| Q | 48.5 | 66.7 | 37.5 | 53.0 |

EXAMPLE 12

Figure 2:
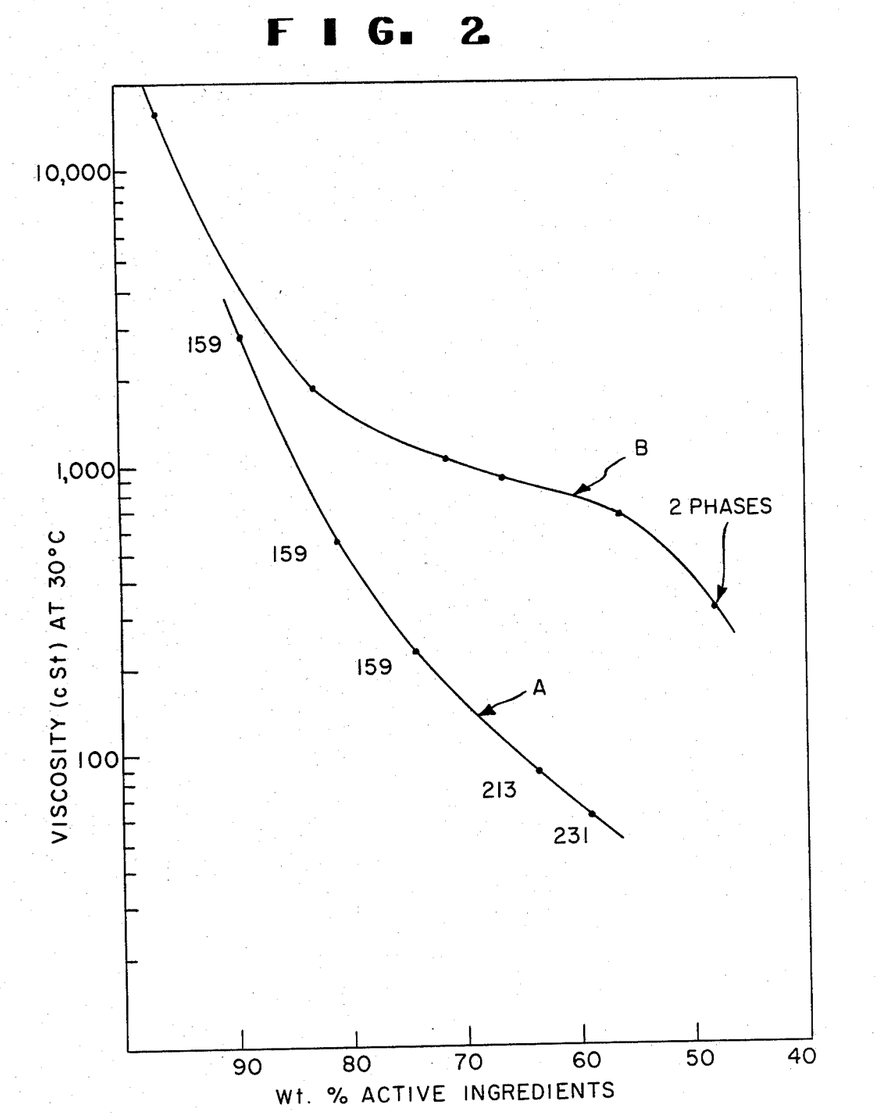
FIG. 2 includes plots which show the variation of viscosity of coating solution with variation of concentration of active ingredients in the coating solution.

Conventional, art-recognized, water-extendable coatings derive their compatibility with water through neutralization of carboxyl groups, which are an integral part of the polymer. This leads to several drawbacks. One, as illustrated in FIG. 2, which is a plot of viscosity (in centistokes) at 30° C. against weight percent active (non-volatile) ingredients, shows that the viscosity seems to level off in the concentration range between 55 and 80 wt %. A vinyl acetate oligomer of the invention, not containing amine-neutralized carboxyl groups, shows a more normal viscosity-NVI relationship. This is very useful, for usually low viscosities are required for efficient roll coat application of thin films.

The coating solutions employed in the experiments represented by FIG. 2 are as follows:

Curve A. The product of Example 2 wherein the active ingredients are:
VAc: 59.0 wt %
HEA: 25.4 wt %
Butyl Acrylate: 3.1 wt %
Mercaptoethanol: 4.0 wt %
Polypropylene Glycol 1025: 8.5 wt %
which product contains, in addition, 32 wt % Cymel® 303 cross-linking resin and an organic solvent. Water was added, in varying amounts, to provide the solution viscosities shown in Curve A. The numbers shown at the points along Curve A indicate the grams of organic solvent per liter of formulation, excluding water.

Curve B. A product, representative of the prior art, wherein the active ingredients are:

VAc: 45.4 wt %
HEA: 13.9 wt %
Butyl Acrylate: 17.9 wt %
Acrylic Acid: 2.0 wt %
Mercaptoethanol: 4.0 wt %
Glycol XD-8025 (water sol.; Dow Chemical Co.): 16.9 wt % which product contains, in addition, 32 wt % Cymel ® 303 cross-linking resin and wherein said product the carboxyl groups from the acrylic acid have been neutralized with ammonium hydroxide. No organic solvent, but 5 wt % water, was present. More water was added, in varying amounts, to provide the solution viscosities shown in Curve B.

Another problem with art-recognized coatings is their reluctance to cure in the presence of amine-neutralized carboxyl groups, as illustrated by data in the following table. As may be seen from the data Formulation C does not cure at all at 185° F. (82° C.), and it takes more than 15 minutes for it to cure at 225° F. (107° C.). However, Formulations D and E, which contain no ammonia, cure very rapidly even at 180° F. (82° C.). They are as good as or better than a solvent-based commercially available control formulation for use in the panelboard coating industry.

CURING OF CLEAR FILMS ON ALUMINUM PANELS

| Formulation C | | Minutes at 82° C. | Pencil Hardness | KH No. |
|---|---|---|---|---|
| Oligomer C | −20.0 g | 30 | Tacky | — |
| | | Minutes at 107° C. | Pencil Hardness | KH No. |
| Cymel ® 350 | −10.0 g | 2 | Tacky | — |
| Water | −30.0 g | 5 | Tacky | — |
| Catalyst 4040 | −1.8 g | 15 | F | 0 |
| (2.5% p-TSA, on active ingredients) | | | | |
| Conc. NH₄OH, just enough to bring into solution | | 30 | 2H | 10 |

| Formulation D | | Minutes at 82° C. | Blocking | Pencil Hardness | KH No. |
|---|---|---|---|---|---|
| Oligomer D | −20.0 g | 1 | 6 | F | 5 |
| Cymel ® 303 | −14.7 g | 2 | 6 | F | 6 |
| Methanol | −3.0 g | 5 | — | — | 10 |
| Water | −25.0 g | | | | |
| Catalyst 4040 | −1.63 g | | | | |
| (2% p-TSA, on active ingredients) | | | | | |
| Formulation E | | | | | |
| Oligomer D | −20.0 g | 2 | 8 | H | 17 |
| Cymel ® 350 | −14.7 g | 5 | 8 | 2H | 18 |
| Methanol | −3.0 g | 15 | 9 | 2H | 20 |
| Water | −25.0 g | | | | |
| Catalyst 4040 | −2.86 g | | | | |
| (3.5% p-TSA, on active ingredients) | | | | | |
| Control* | | 1 | 6 | 2B | 8 |
| | | 2 | 7 | 2B | 8 |
| | | 3 | 8 | B | 11 |

*Commercial coating formulation (25 wt % active ingredients in an organic solvent)

Oligomer Compositions

| Oligomer | Composition | wt % | Active Ingredients wt % | Solvent, wt % |
|---|---|---|---|---|
| C. | Vinyl Acetate | 45.2 | | |
| | HEA | 14.0 | 94.2 | Water, 5.8 |
| | Butyl Acrylate | 16.0 | | |
| | Acrylic Acid* | 4.0 | | |
| | Mercaptoethanol | 4.0 | | |
| | Glycol XD-8025 | 17.0 | | |
| D. | Vinyl Acetate | 58.0 | 90.0 | Cellosolve ®, 4.7; methanol, 5.3 |
| | HEA | 28.3 | | |
| | Mercaptoethanol | 3.8 | | |
| | Glycol (polypropylene-425) | 10.0 | | |

*Neutralized with ammonia after polymerization.

In the aforesaid table pencil hardness was determined by ASTM D 3363-74 and Knoop hardness, by ASTM D 1474-68, Method A, Knoop Indentation Hardness. The following description sets forth the procedure used to determine blocking.

Coatings are cured on aluminum panels; coupons (e.g., 5 cm×5 cm) are then placed in a jig so that the coated sides face each other and are heated under a pressure of 25 psi (170 kPa) for 1 h at 140° F. (60° C.). The ease of separation of the coupons is then rated on a scale of 1 to 10 (10=no blocking) according to ASTM method of rating D 3003-71.

EXAMPLE 13

Pot Life of Catalyzed Formulations

Industrial application of clear topcoats to panelboards or clear paper coatings requires extremely rapid cure rates. Yet, to be practical, the pot lives of catalyzed formulations at room temperature should be at least 6–8 h, and preferably even longer.

Figure 3:
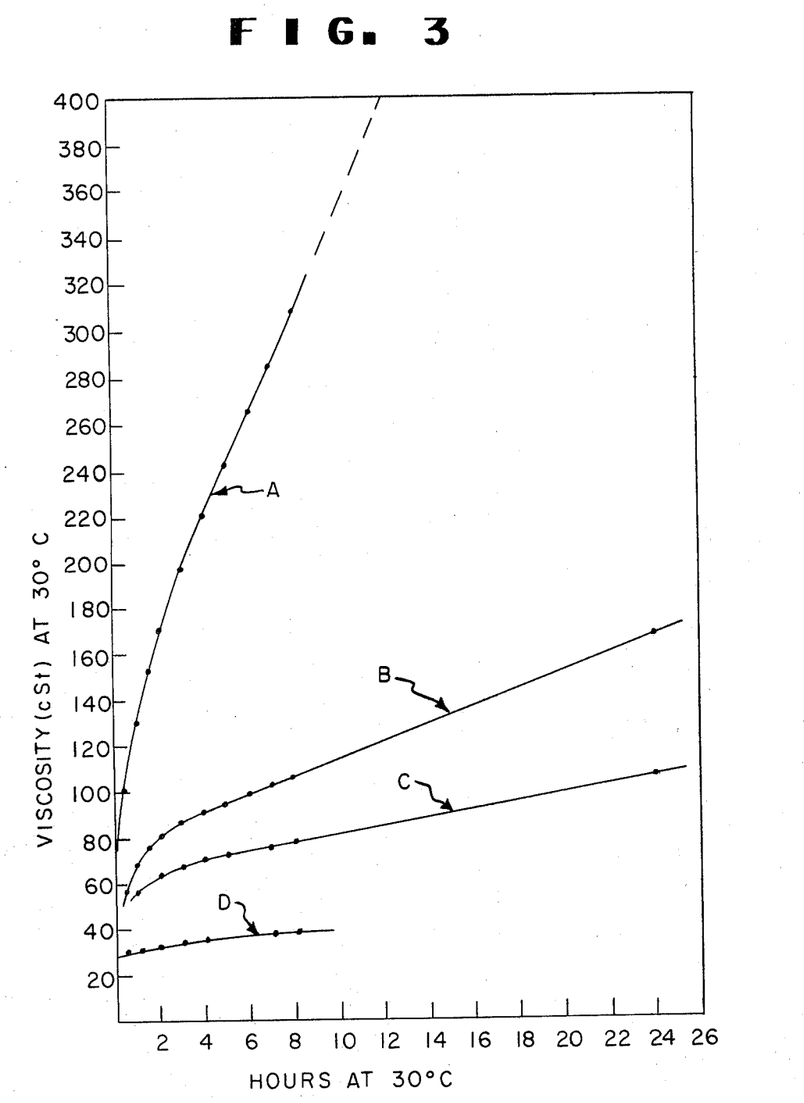
FIG. 3 includes plots which show the pot life of coating solutions containing varying amounts of mercaptoethanol and a polyalkylene ether glycol.

The curves in FIG. 3, which is a plot of viscosity at 30° C. against time in hours, indicate that the molecular weight of the oligomer and the presence of glycol exert a marked effect on the pot life. Thus, a high molecular weight oligomer made without any glycol shows a rapid rise in viscosity (Curve A). The same oligomer composition made with four times as much mercaptoethanol (Curve B) shows a very acceptable pot life. Such formulations can still be used even after 24 h from the time of addition of the cross-linking catalyst. The presence of 20 and 30 wt % of Polypropylene Glycol 425 in the oligomer (Curves C and D, respectively) exerts an even greater effect on the viscosity stability of catalyzed formulations. In these formulations the ratio of oligomer active ingredients to hexamethoxymethyl melamine was 66:34. The organic volatiles per liter of formulation, excluding water, were: 191 g of monoethyl ether of ethylene glycol and 53 g of isopropanol. As well known to those skilled in the art, addition of low molecular weight alcohols would increase the viscosity stability of such catalyzed formulations even further.

Each coating solution represented in FIG. 3 included an oligomer within the invention; it contained 50 weight percent active (non-volatile) ingredients, including 1.5 weight percent p-toluene-sulfonic acid; and the organic volatiles content was 244 grams per liter of formulation, excluding water. Additional data are summarized below.

| | Wt % | | |
|---|---|---|---|
| | Mercaptoethanol | Polypropylene Glycol 425 | Equiv. of OH/100 g Active Ingredient |
| A. | 1.0 | 0 | 0.295 |
| B. | 4.0 | 0 | 0.300 |
| C. | 2.8 | 20 | 0.294 |
| D. | 2.8 | 30 | 0.295 |

BEST MODE FOR CARRYING OUT THE INVENTION

As presently contemplated, the best mode for carrying out the invention resides in the oligomer solution of Example 2, the coating solutions of Examples 10, 11 and 12, and the two-part coating solution system described hereinabove.

INDUSTRIAL APPLICABILITY

The utility of the water-extendible coating solutions of this invention is at least equal to that of the commonly-used solvent-based coating solutions.

Although the disclosure of invention hereinabove illustrates and describes preferred embodiments of the invention, it is to be understood that there is no intent to limit the invention to the precise constructions herein disclosed, and it is to be further understood that the right is reserved to all changes and modifications coming within the scope of the invention as defined in the appended claims.

I claim:

1. Coating solution consisting essentially of:
(a) about 30 to 75 wt % of the following non-volatile ingredients which are present in amounts, relative to each other:
  (i) 30 to 80 wt % of an oligomer having a degree of polymerization (DP) of about 10 to about 50 and a polyalkylene ether glycol having a molecular weight of about 400 to about 1300, the amount of glycol being 0 to 60 wt % of the amount of oligomer;
  (ii) 2 to 12 wt % of a non-volatile, water-miscible compound selected from p-toluenesulfonic acid, trifluorosulfonic acid, 5-sulfosalicyclic acid, 1-naphthalene-sulfonic acid, 2,5-dimethylbenzenesulfonic acid, the sodium salts of the above acids, the sodium salts of aliphatic monocarboxylic acids having 6 to 12 carbon atoms, ammonium benzoate, and sodium di-2-ethylhexylsulfosuccinate;
  (iii) 5 to 65 wt % of an amine-aldehyde cross-linking resin; and
  (iv) 0 to 10 wt % of an acidic curing catalyst;
and
(b) 25 to about 70 wt % of the following volatile ingredients which are present in amounts, relative to each other:
  (i) 5 to 70 wt % of water-miscible organic solvent; and
  (ii) 30 to 95 wt % of water,
with the sum of the weight percentages being 100% for each of (a) and (b); (i), (ii), (iii) and (iv) of (a); and (i) and (ii) of (b), and with the proviso that the amounts of non-volatile ingredients, water and organic solvent are such that the coating solution contains not more than 250 g of volatile organic compounds per liter of solution, excluding water, the oligomer of (a) (i) being prepared by uniformly copolymerizing, using free radical initiation, in the presence of about 0.5 to about 10 wt % of a mercaptan of the formula $R^2SH$ wherein $R^2$ is hydroxyalkyl or alkyl of 2 to 10 carbon atoms:
(a) 0 to about 80 wt % of a monomer selected from vinyl acetate, vinyl propionate, N-vinyl pyrrolidone, acrylamide, acrylonitrile, vinyl chloride, methyl vinyl ether, ethyl vinyl ether, and styrene; provided, however, the amount of styrene shall not exceed 60 wt %;
(b) about 5 to about 50 wt % of a monomer selected from hydroxyethyl and hydroxypropyl acrylates and methacrylates; and
(c) 0 to about 80 wt % of a monomer selected from alkyl acrylates and alkyl methacrylates, wherein alkyl is of 1 to 8 carbon atoms,
with the sum of the weight percentages being 100%.

2. Coating solution of claim 1 wherein the oligomer has been prepared in the presence of a water-miscible solvent.

3. Coating solution of claim 2 consisting essentially of:
(a) 40 to 70 wt % of the following non-volatile ingredients which are present in amounts, relative to each other:
  (i) 45 to 75 wt % of the oligomer and polyalkylene ether glycol;
  (ii) 3 to 8 wt % of the water-miscible agent;
  (iii) 20 to 40 wt % of an alkylated urea-aldehyde or melamine-aldehyde cross-linking resin; and
  (iv) 3 to 6 wt % of the acidic curing catalyst;
and
(b) 30 to 60 wt % of the following non-volatile ingredients which are present in amounts, relative to each other:
  (i) 10 to 50 wt % of the water-miscible organic solvent; and
  (ii) 50 to 85 wt % of water.

4. Two-part coating solution of claim 1 wherein the amine-aldehyde cross-linking resin is in one part and the acidic curing catalyst is in the other part.

5. Coating solution of claim 2 wherein the oligomer is an oligomer of vinyl acetate, hydroxyethyl acrylate, and an alkyl acrylate wherein alkyl is of 1–8 carbon atoms, the polyalkylene ether glycol is polypropylene glycol having a molecular weight of about 400 to about 1300, the water-miscible agent is p-toluenesulfonic acid or its sodium salt, the amine-aldehyde cross-linking resin is an alkylated urea-aldehyde or melamine-aldehyde resin, and the water-miscible organic solvent is ethylene glycol monoethyl ether.

* * * * *